Sept. 12, 1967     J. L. BACHMAN     3,341,798

ELECTROMECHANICAL TRANSDUCER

Filed Feb. 2, 1966

OUTPUT

INVENTOR
JOHN L. BACHMAN

BY *Melvin L. Crane* AGENT

*R. S. Sciascia* ATTORNEY

United States Patent Office 3,341,798
Patented Sept. 12, 1967

3,341,798
ELECTROMECHANICAL TRANSDUCER
John L. Bachman, Falls Church, Va., assignor to the United States of America as represented by the Secretary of the Navy
Filed Feb. 2, 1966, Ser. No. 524,978
4 Claims. (Cl. 338—47)

ABSTRACT OF THE DISCLOSURE

The subject matter hereby is directed to an electromechanical transducer which is secured to an object which is to be tested for motion relative to a base upon which the object rests. The device includes a drum upon which one end of a cable is wound and the other end of the cable is secured to the base upon which the object to be tested is mounted. A spring under torsion maintains the cable under constant tension, and a potentiometer having a movable contact that moves with the drum produces an electrical current representative of the physical movement of the transducer device relative to the base to which the cable is connected.

---

The present invention relates to the electromechanical transducers and more particularly to such devices for measuring movements along a specific line with little error while deflections are occurring in other directions.

Heretofore relative displacement transducers have been provided in which the transducer measures relative displacement in one plane. However, movement in other planes affect the ability to accurately measure the displacement in the desired plane. Such measuring devices are of the differential transformer, capacitance, and radially strictive transducer types which are almost impossible to use where there is movement in all directions. Such prior art gages are usually bulky or cumbersome devices which restrict their use to certain types of measurements. At times, circumstances arise which require a device operative under conditions wherein motion is in all directions. Thus, various types of well-known displacement measuring devices are not usable under conditions wherein motion is in all directions.

The present invention overcomes the major drawback in prior art devices by providing a device which is operable for measuring displacements in which simultaneous motion in all directions is prevalent. The device of the present invention may be made to measure amplitudes of desired distances at different frequencies, depending on the amplitude. The device produces an electrical signal which is directly proportional to the amount of displacement encountered during use. The electrical signal is then directed to a meter, recorder or some other suitable indicator to indicate the amplitude of the displacement.

It is therefore an object of the present invention to provide a device for measuring relative displacement along a major axis while deflections are occurring in the other axes.

Another object is to provide a simple, lightweight, easily operable device for measuring relative displacements between two points.

Still another object is to provide a device which may be operated by unskilled as well as skilled operators.

Yet another object is to provide a device which is not affected by motion in different directions and which will provide accurate measurement in the desired direction.

Other objects and advantages of the invention will hereinafter become more fully apparent from the following description of the annexed drawing, which illustrates different embodiments of the invention, and wherein.

The teaching of the present invention is directed to a relative displacement electromechanical transducer. The electromechanical transducer includes a housing which supports a horizontal shaft to which a drum is secured and upon which a cable is connected. Movement of the cable rotates the mechanical drum which in turn rotates the contacts of a potentiometer. The output of the potentiometer is directly related to the rotation of the shaft and and represents the amount of displacement between the test item and the measuring device. A constant tension spring is secured to the shaft at one end of the spring for the purposes of maintaining a constant tension on the shaft such that rotation of the shaft in either direction will be the same throughout any part of the rotation thereof. The purpose of the constant tension spring secured to the rotatable shaft is to maintain the cable taut such that there is no slack in the movement thereof.

Figure 1:
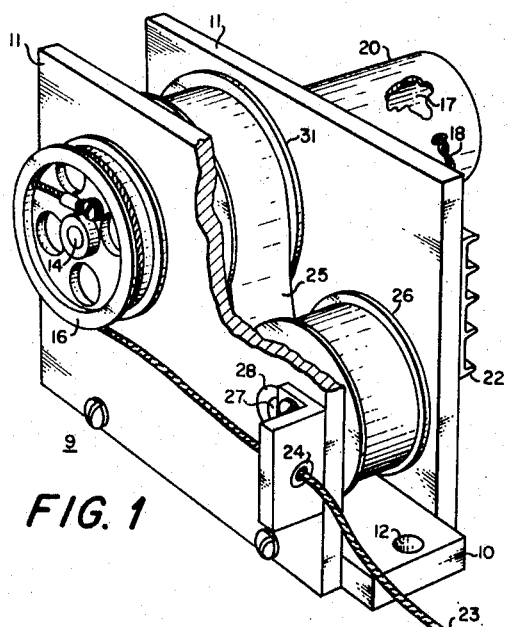
FIG. 1 is a pictorial view of a device made in accordance with the present invention.

Now, referring to the drawing, there is shown by illustration in FIG. 1 one embodiment of the present invention. As shown, the device is provided with a flat base 10, which is provided with apertures at each end for the purpose of securing the device to a test item or to a base which may be secured to a test device. The base is provided with spaced apart parallel upstanding plates which are secured at the bottom thereof to the base and are open at the top to provide a U-shaped housing for the working elements of the device. A shaft 14 is mounted in any suitable bearings 15 secured within suitable apertures in the upright plates. One end of the rotatable shaft has a drum 16 axially secured thereto and the other end of the shaft is secured mechanically to a rotatable electrical contact element of a multiturn potentiometer 17. Electrical wires 18 that supply the voltage to the potentiometer and for taking the signal off the potentiometer are connected to the contacts 21 of a terminal block 22 which is secured to the sidewall of the housing. Accordingly, the potentiometer is also secured to the sidewall of the housing in alignment with shaft 14 by a bracket. Housing may be secured about the potentiometer and secured to the upright wall for protection of the potentiometer. The drum secured to the rotatable shaft on the opposite end thereof from the potentiometer has secured thereto one end of a cable 23 of flexible steel which is wrapped around the drum at least two turns and then extended outwardly therefrom. The cable passes through a hardened steel guide 24 secured to a sidewall of the housing near the drum so that the cable will not ride off the drum due to any side movement of the cable further out from the drum. In order to provide a constant tension on the rotatable shaft, a negator type spring 25, wound on a spool 26 which is secured about a shaft 27 in which the shaft thereof is rotatable within suitable bearings 28 in the sidewalls of the housing, is provided for this purpose. (A negator spring is one which is wound onto a spool and has the characteristics of returning or rewinding onto the spool while applying a constant force throughout its entire length onto a work piece after being pulled out linearly and then released.) The negator spool is held in place between the sidewalls and rotatable on the shaft which is rotatable within the ball bearings secured within the sidewalls. The free end of the negator spring is secured to a drum 31 which is secured to the shaft between the end drum 16 and the potentiometer 17. The drum 31 secured to the shaft between the sidewalls is rigidly secured thereto such that the shaft, outer drum 16 and center drum 31 rotate at the same time. In setting the device up for operation, the negator spring is secured to the drum 31 and wrapped around the drum such that there are two turns of the negator spring on the larger drum 31. This is comparable to the two turns of the cable on the outer drum 16. The diameter of the drum to which the cable is secured is such that one complete revolution of the drum is sufficient to extend or take up the cable for the maximum deflection to be measured. Thus the negator spring and drum are at a null position or at the zero position of the potentiometer when there are two turns of the cable on the outer drum and two turns of the negator spring on the central drum 31. The negator spring provides a constant tension on the center drum such that a rotation in either direction due to the deflection of the cable on the outer drum will provide the same amount of energy on the cable. The tension applied to the center drum is only sufficient to prevent any slack in the cable during test.

Figure 2:
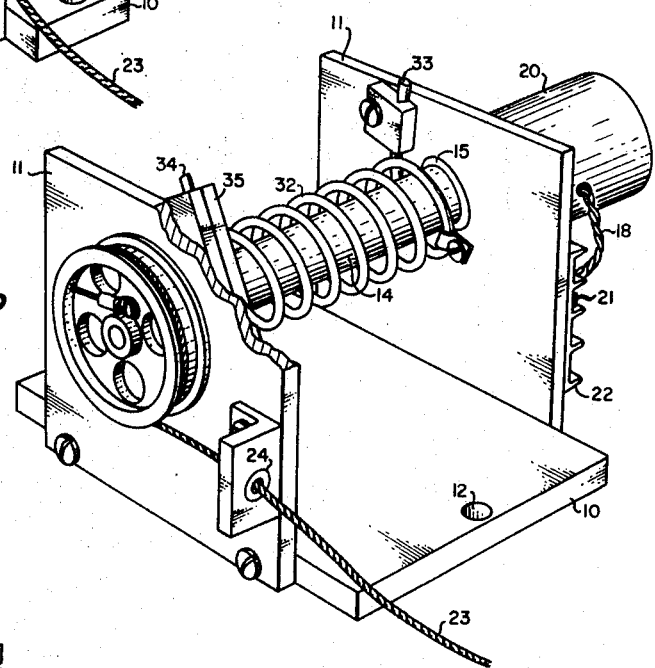
FIG. 2 is a modification of the device as shown in FIG. 1.

The modification illustrated by FIG. 2 is substantially as the device described for FIG. 1 with the exception that the base of the device in FIG. 2 is substantially wider than the device of FIG. 1 and the negator spring 25 and drum 31 as described in FIG. 1 are replaced by a helical spring 32 which surrounds the shaft between the outer drum and the potentiometer. One end 33 of the helical spring is secured to the upright wall and the opposite end 34 of the helical spring is secured by an adaptor 35 of any suitable kind, to the shaft such that the spring is rotated by the shaft, thereby producing torsion in the spring. The force on the shaft from a null position in either direction is the same on the rotatable shaft, regardless of which direction the shaft is rotated. The purpose of the helical spring about the shaft is the same as for the negator spring as shown in FIG. 1, that is, the negator-type spring and the helical-type spring serve to hold the cable taut as the cable moves through the displacement when in use.

Figure 3:
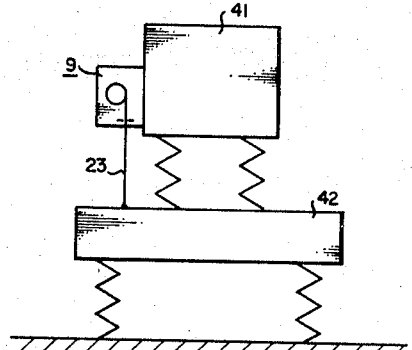
FIG. 3 is a schematic of a device of the present invention connected to a device in which the displacement is to be measured.

An operation of the device to determine the relative displacement of the element to be tested relative to another point is illustrated in FIG. 3, which is as follows: The base of the electromechanical measuring device is secured to the object of which the relative motion is to be determined. The loose end of the cable is secured to the point to which the relative movement of the device is to be determined such that when the cable is taut the position of the outer drum with respect to the potentiometer is such that the electrical contact of the potentiometer is in a null position. At the time that the loose end of the cable is secured to the point relative to the object whose displacement is being detected, there must be at least two turns of the cable and the negator spring on the respective drums for the device as shown in FIG. 1. In the device as shown in FIG. 2, the cable must have at least two revolutions on the outer drum and the helical spring of the device as shown in FIG. 2 must be at a null position. The output signal of the transducer is secured electrically to a recorder or some other indicating device which will trace or indicate the unbalance in the circuit. During tests, the object to which the test device has been secured moves relative to the point to which the loose end of the cable has been secured and as the outer drum of the test device rotates with respect to the displacement between the test device and the relative point with respect to the object, the drum rotates such that an electrical output by the potentiometer will indicate the relative displacement.

In carrying out the invention, the test device may be secured to the object which is being tested by any suitable means such as by screws, bolts, or even the base of the device may be secured to the object by some substance which will adhere to the device. In those cases where the transducer element cannot be mounted directly to the test device, an intermediate pad may be secured to the test device and the transducer secured to the pad. The essential feature is that the test device be secured to the object which is being tested sufficiently that the movement between the relative point to which the cable is secured and the device is such that the device will not pull loose from the object to which it is secured.

Figure 4:
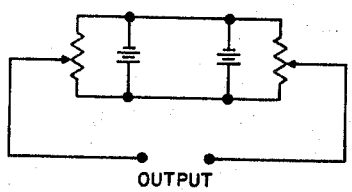
FIG. 4 is an electrical schematic drawing of the electrical circuitry of the electrical measuring unit as used in the present device.

FIG. 4 illustrates the voltage divider circuitry which represents the resistance elements of the multiturn potentiometer which has secured thereto a battery. The output signals are taken from suitable output lines which are secured to the electrical contacts on the terminal panel, that is, secured to the upright side piece.

It has been determined that the device using the helical-type spring, will track movements of ±6 inches at frequencies up to 15 c.p.s. (140$g$), and the negator-type spring unit will operate satisfactorily until an acceleration of at least 45$g$'s is encountered.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. An electromechanical transducer for measuring relative movement between a test device and a desired point, which comprises:
   a housing;
   a shaft rotatably secured by said housing;
   a drum;
   said drum secured axially to said shaft and rotatable therewith;
   an electrical signal-producing means;
   said electrical signal-producing means secured relative to said rotatable shaft and operative thereby to produce an electrical signal output corresponding to any rotation of said rotatable shaft by rotation of said drum in either direction;
   a helical spring means secured about said shaft coaxial therewith,
   means interconnecting one end of said spring means to said shaft with the other end fixedly secured relative to said shaft whereby
   said spring means applies a constant force on said shaft to provide a uniform rotational movement thereto in either direction.

2. An electromechanical transducer as claimed in claim 1, in which:
   cable means is secured at one end to said drum on said shaft with the other end free to be secured to a point relative to the electromechanical transducer device during operation thereof.

3. An electromechanical transducer as claimed in claim 2, wherein:
   said helical spring means is secured about said rotatable shaft between said drum and said electrical signal producing means.

4. An electromechanical transducer as claimed in claim 3, in which:

said electrical signal producing means is a multiturn potentiometer.

References Cited

UNITED STATES PATENTS

| | | | |
|---|---|---|---|
| 2,546,155 | 3/1951 | Haber et al. | 338—5 |
| 2,681,967 | 6/1954 | Harrison et al. | 338—89 |
| 2,712,127 | 6/1955 | Miller | 73—313 |
| 2,745,087 | 5/1956 | Dickinson | 73—313 |
| 2,745,633 | 5/1956 | Cornwall | 340—271 |
| 2,758,474 | 8/1956 | McKinney | 73—313 |
| 3,004,432 | 10/1961 | Mayes | 73—313 |
| 3,097,533 | 7/1963 | Heinzmann | 73—503 |

OTHER REFERENCES

The Neg'ator in Instrumentation, by Harry Mankomen, I.S.A. Journal, September 1952, pages 115–119.

RICHARD M. WOOD, *Primary Examiner*.

W. D. BROOKS, *Assistant Examiner*.